(No Model.)
O. LEINBROCK.
COFFEE MILL.
No. 517,614. Patented Apr. 3, 1894.
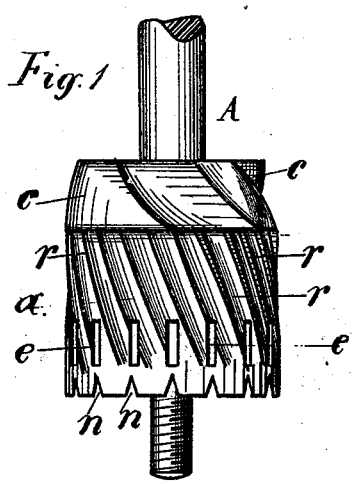
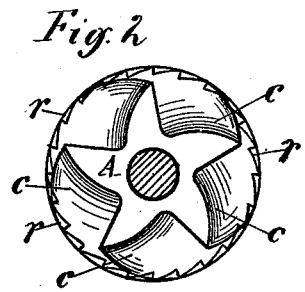
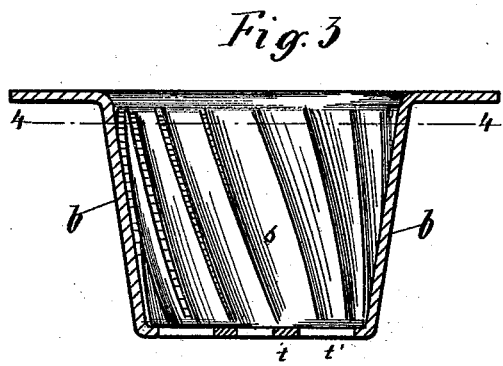
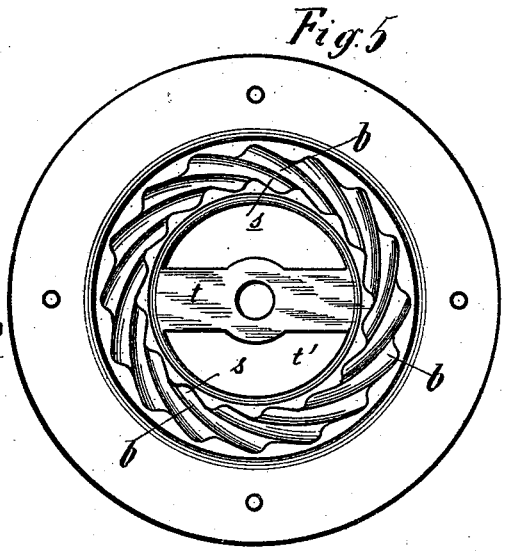
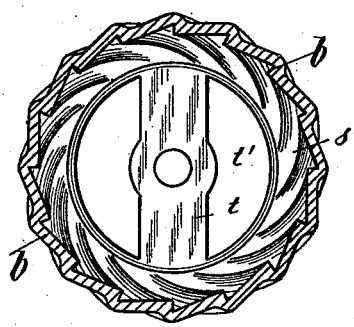
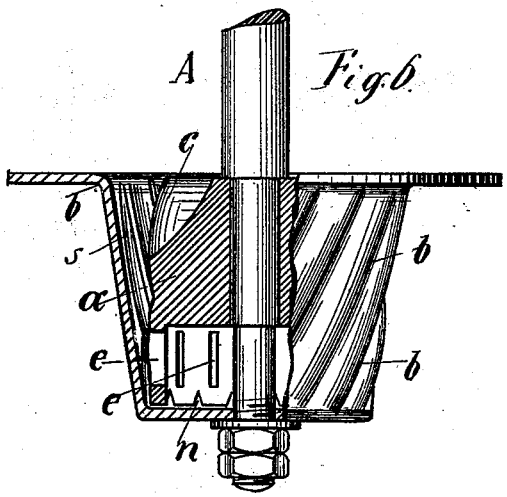
WITNESSES:
INVENTOR:
O. Leinbrock
ATTORNEYS.

UNITED STATES PATENT OFFICE.

OSKAR LEINBROCK, OF GOTTLEUBA, GERMANY.

COFFEE-MILL.

SPECIFICATION forming part of Letters Patent No. 517,614, dated April 3, 1894.

Application filed July 8, 1893. Serial No. 479,900. (No model.) Patented in Belgium June 15, 1889, No. 86,346; in Germany October 30, 1889, No. 49,432, and in Austria-Hungary November 4, 1889, No. 22,672 and No. 53,440.

*To all whom it may concern:*

Be it known that I, OSKAR LEINBROCK, a citizen of Germany, and a resident of Gottleuba, in the Kingdom of Saxony, Germany, have invented certain new and useful Improvements in Coffee-Mills, (for which I have obtained Letters Patent in Germany, No. 49,432, dated October 30, 1889; in Belgium, No. 86,346, dated June 15, 1889, and in Austria-Hungary, No. 22,672 and No. 53,440, dated November 4, 1889,) of which the following is a specification.

The object of my invention is to provide a new and improved mill for grinding coffee, spices, &c., which is simple in construction, strong and durable and at all times grinds to the same degree of fineness.

The invention consists in a coffee and spice-mill provided with a runner having spirally disposed cutting edges or ridges on its outer surface at the lower part, and large spiral teeth at the top part. The lower part of the runner is made hollow and the side-walls of the hollow are provided with slots and notches which form the bottom edge of the runner.

In the accompanying drawings,—Figure 1 is a side-view of the runner of my improved coffee-mill. Fig. 2 is a plan-view of the same, the shaft being in section. Fig. 3 is a vertical transverse sectional view through the cylinder. Fig. 4 is a horizontal sectional view of the same, on the line 4—4, of Fig. 3. Fig. 5 is a plan-view of the cylinder, and Fig. 6 is a side-view of the same and the runner therein, parts being shown broken out and others in section.

Similar letters of reference indicate corresponding parts.

Both the runner $a$ and the cylinder $b$ are made of metal. The runner is made cylindrical with the exception of the upper third, which is made slightly conical and provided with a series of large spiral teeth $c$. The cylindrical part of the runner is provided on its outer surface with a series of spirally disposed ridges or cutting edges $r$, which extend to within a short distance from the bottom of the same. The runner is provided in its under side with a hollow which extends up to about one third of the height of the runner, and in the sides of said hollow slots or openings $e$ are formed, notches $n$ being formed in the bottom edge of the runner. The cylinder $b$ which is made slightly tapering is provided on its inner surface with spirally disposed ridges or cutting edges $s$, and with a bottom cross-piece $t$ at the sides of which openings $t'$ are formed, said cross-piece serving as a bearing for the lower end of the spindle or shaft $A$ on which the runner is secured. The large teeth $c$ on the upper part of the runner serve to break the material to be ground and convey the same to the annular space between the runner and the cylinder, which annular space gradually decreases in width from top to bottom, and in said space the substance is ground by the spirally disposed ridges or cutting edges $r$ and $s$. As the grinding surfaces do not come in contact they wear off but slightly or not at all. The ground material passes through the slots $e$ and notches $n$ of the runner and then drops through the openings in the bottom of the cylinder into a suitable receptacle. It follows that only that material can leave the cylinder that has been ground sufficiently fine to pass through said slots or notches, and as the sizes of these slots or notches constantly remains the same, the mill at all times grinds to the same degree of fineness.

Having thus described my invention, I claim as new and desire to secure by Letters Patent—

1. A coffee and spice-mill runner, provided at its top with spirally shaped teeth, and on the outer surface of its lower part with spirally disposed ridges or cutting edges, the lower part of the runner being hollow and having side-openings, substantially as set forth.

2. A runner for coffee and spice-mills, made cylindrical and hollow at its bottom, which runner is provided on its outer surface with spirally disposed ridges or cutting edges, and has slots in the walls of the hollow part, substantially as set forth.

3. A runner for coffee and spice-mills, having its bottom part made hollow and provided with spirally disposed ridges or cutting edges on its surface, and having slots in its sides near the bottom, and notches in the bottom edge, substantially as set forth.

In testimony that I claim the foregoing as my invention I have signed my name in the presence of two witnesses.

OSKAR LEINBROCK.

Witnesses:
OSCAR SCHMEIDLER,
PAUL ARRAS.